United States Patent [19]
Tanguy

[11] 3,899,961
[45] Aug. 19, 1975

[54] PORTABLE COOKING APPLIANCE

[75] Inventor: Pierre J. Tanguy, Pontoise, France

[73] Assignee: Etud S.A., Dijon, France

[22] Filed: July 3, 1973

[21] Appl. No.: 376,240

[30] Foreign Application Priority Data
July 6, 1972   France .............................. 72.24595

[52] U.S. Cl. .................... 99/340; 99/421 H; 126/38
[51] Int. Cl.². A47J 33/00; A47J 37/07; F24C 5/20
[58] Field of Search ......... 99/419, 420, 421 H, 358, 99/339–340, 372–373, 376–378, 442, 446; 126/9, 38, 41, 275

[56] References Cited
UNITED STATES PATENTS

| | | | |
|---|---|---|---|
| 1,354,393 | 9/1920 | Groot.................................... | 126/38 |
| 1,563,895 | 12/1925 | Coleman............................... | 126/38 |
| 1,711,226 | 4/1929 | Davidson.............................. | 126/38 |
| 2,641,247 | 6/1953 | Genebach ..................... | 126/41 E X |
| 2,722,882 | 11/1955 | Wilson.............................. | 99/421 H |
| 2,847,932 | 8/1958 | More ................................. | 99/421 H |
| 2,852,016 | 9/1958 | Weatherwax ..................... | 126/38 X |
| 2,861,562 | 11/1958 | Ross et al. ............................. | 126/38 |
| 2,972,942 | 2/1961 | Goldberg ........................ | 126/9 R X |
| 3,611,912 | 10/1971 | Choc.................................... | 99/339 |
| 3,633,491 | 1/1972 | Williams et al. .............. | 99/421 H X |

*Primary Examiner*—Edward L. Roberts
*Assistant Examiner*—Arthur O. Henderson
*Attorney, Agent, or Firm*—Young & Thompson

[57] ABSTRACT

A portable cooking appliance comprising a heating device mounted in an oven having a structure consisting of at least one base, side and rear walls and a top portion associated with an external hot-plate. The oven structure is capable of folding and of being housed within a portable case designed in two sections which consist of a bottom portion and a cover and at least one of which constitutes one of the components of the oven structure in the service position of the appliance, means being further provided for ensuring automatic unfolding of the oven structure as the portable case is opened.

12 Claims, 16 Drawing Figures

FIG.1

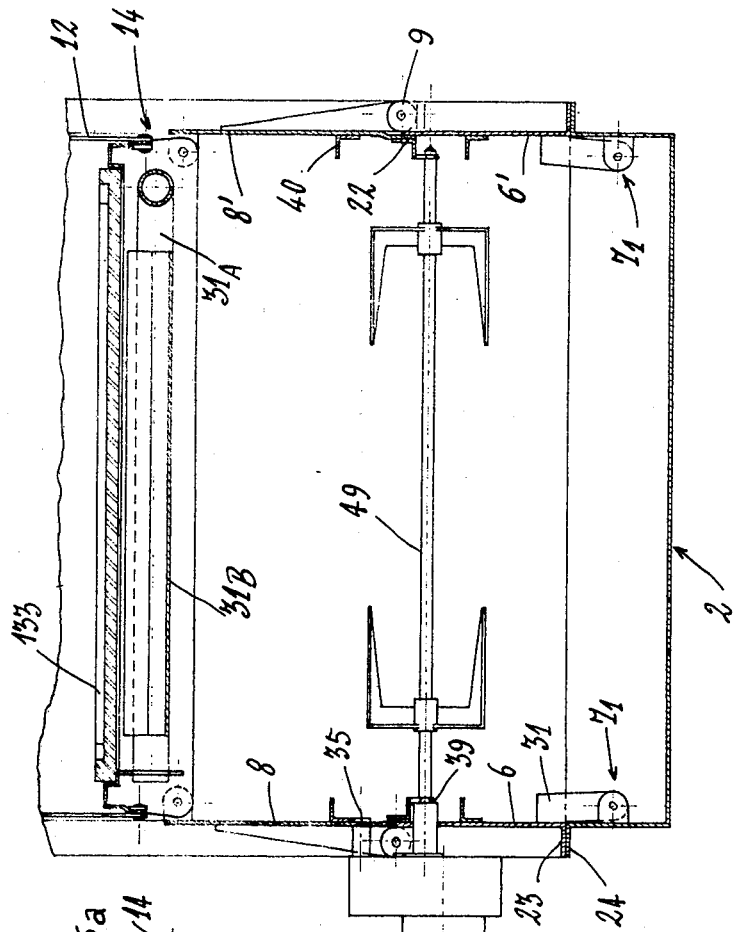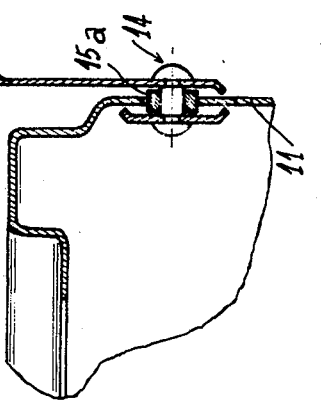

FIG.9
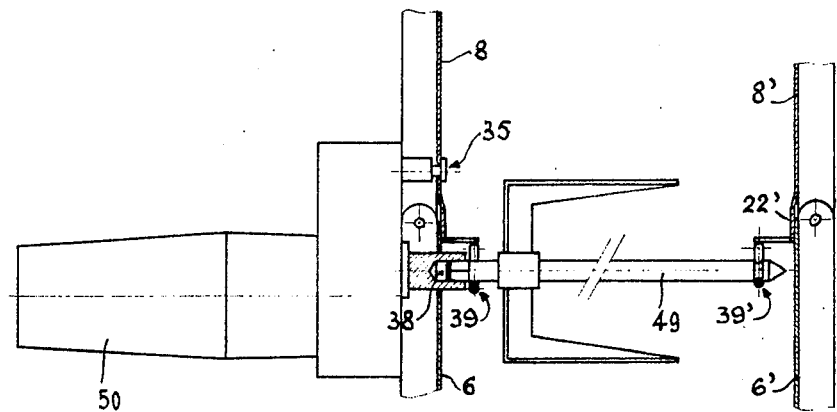
FIG.10
FIG.11
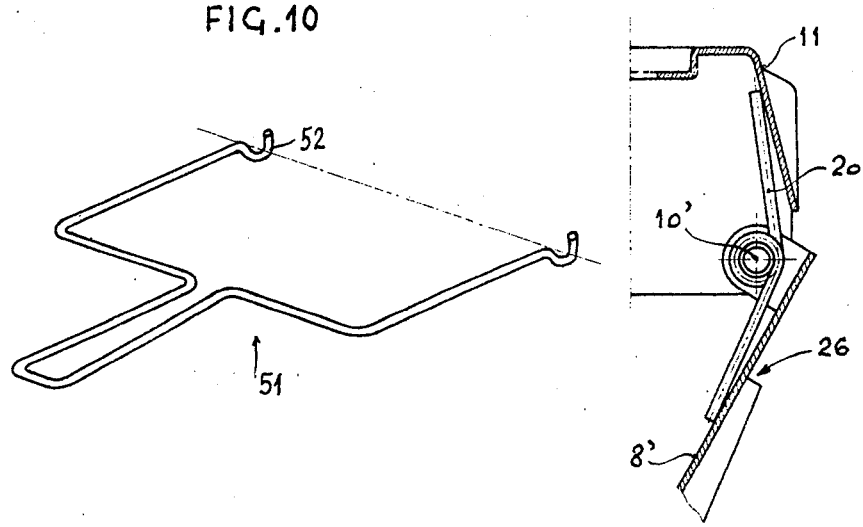

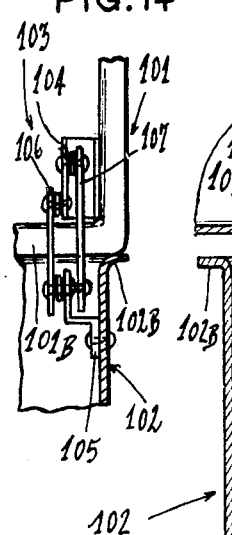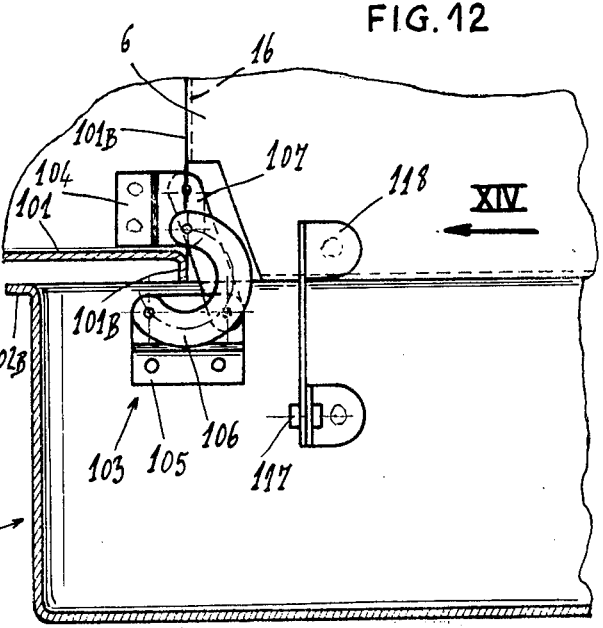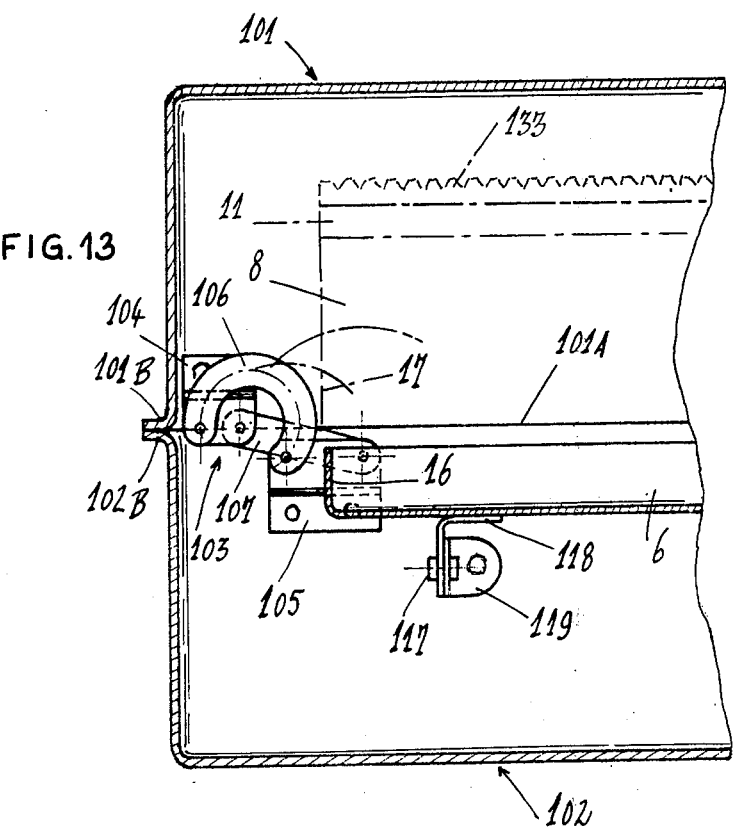

PORTABLE COOKING APPLIANCE

This invention relates to a cooking appliance of the gas type in particular and primarily intended for camping and open-air cooking. The appliance forms a small portable stove and a roasting oven and makes it possible in addition to the traditional types of cooking on a portable stove to prepare grilled steaks by contact or roast meat by infrared radiation.

The known devices for open-air cooking are subject to a number of disadvantages. Among other things, they do not permit complete storage of all the cooking accessories and usually permit only a single function (cooking stove, infrared grill or barbecue-type grill unit). Said devices often call for manual assembly of the different components. This assembly is usually long and complicated, which is tedious, especially when the appliance is only in use for a short period of time.

The cooking appliance in accordance with the invention is intended to overcome these disadvantages. In fact, a place is provided for all the accessories within the appliance which is presented in the form of a portable case in the closed condition. Positioning of the components is performed automatically by unfolding at the time of opening of the portable case. At the time of closure, the components fold back of their own accord. Manual assembly operations are reduced strictly to the requirements of the intended use (positioning of the dripping-pan, spit and roasting-jack, front door).

In accordance with the invention, the portable cooking appliance which comprises a heating device mounted in an oven having a structure consisting of at least one base, side walls and a top portion associated with an external hot-plate, is characterized in that the structure of the oven is capable of folding and of being housed within a portable case, said portable case being provided with a base and a cover, at least one of these portable-case elements being such as to constitute one of the aforementioned portions of the oven structure in the service position of the appliance, means being further provided for ensuring automatic unfolding of the oven structure as the portable case is opened.

By virtue of this automatic unfolding of the oven structure, the invention makes it possible to avoid tedious and unreliable operations of known devices.

In a preferred embodiment of the invention, the base and the cover of the portable case are substantially identical; each side wall of the oven has two substantially flat elements pivotally coupled to each other and respectively to the base and to the top portion of the oven; a mechanical linkage connects the cover to the top portion of the oven; the side walls of the oven are attached to the bottom of the portable case by means of articulations which permit sliding displacement of the lateral walls along the axis of said articulations in order to bring the rear edge of said side walls into the service position of the appliance in contact with the cover which constitutes the rear wall of the oven.

The experience of the present applicant has shown that these arrangements permit a convenient, economical and durable application of the invention.

Further properties and advantages of the invention will now become apparent from the following description of a few embodiments of the invention which are given by way of example without any limitation being implied, reference being made to the accompanying drawings, wherein:

FIG. 3 is a sectional view taken along line III—III of FIG. 1;

FIG. 4 is an enlarged portion of FIG. 3 and showing the sliding articulation of a link-arm;

FIG. 9 is a partial enlarged view of FIG. 3 showing the mode of assembly of the spit and spit-driving motor;

FIG. 10 shows the spit-extraction fork;

FIG. 11 is an enlarged portion of FIG. 7 showing the spring-type articulation of the upper portion of one of the sides of the appliance;

Figure 1:
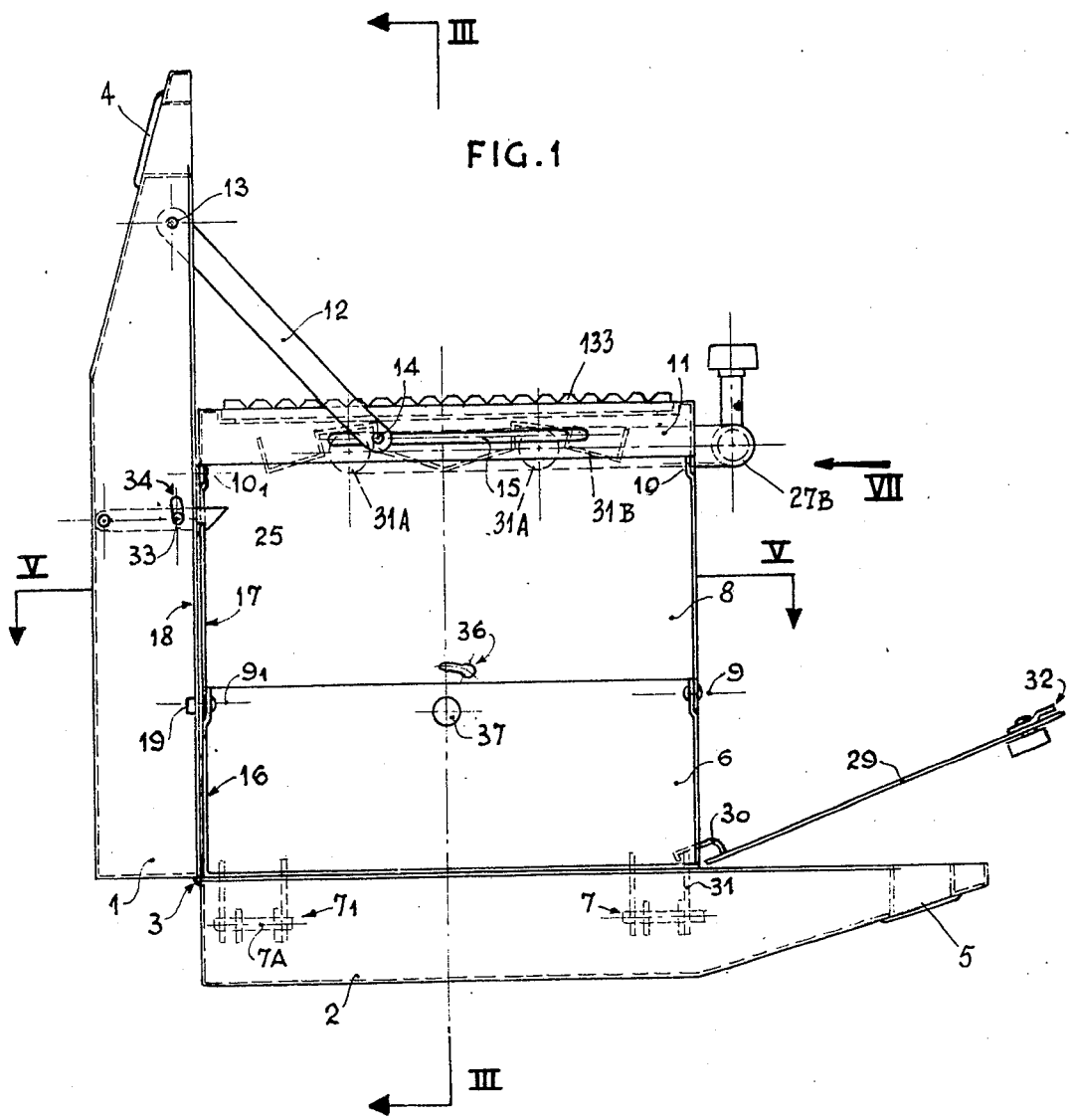
FIG. 1 is a side view of the appliance in accordance with the invention, in the open position.
Figure 15:
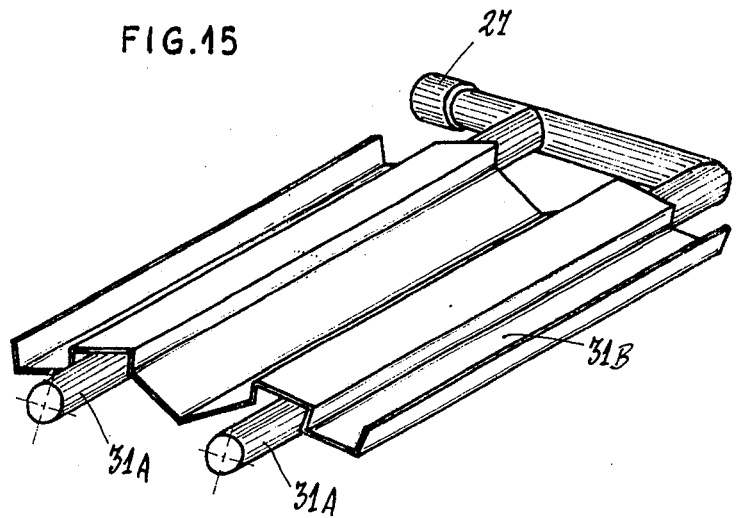
Figure 16:
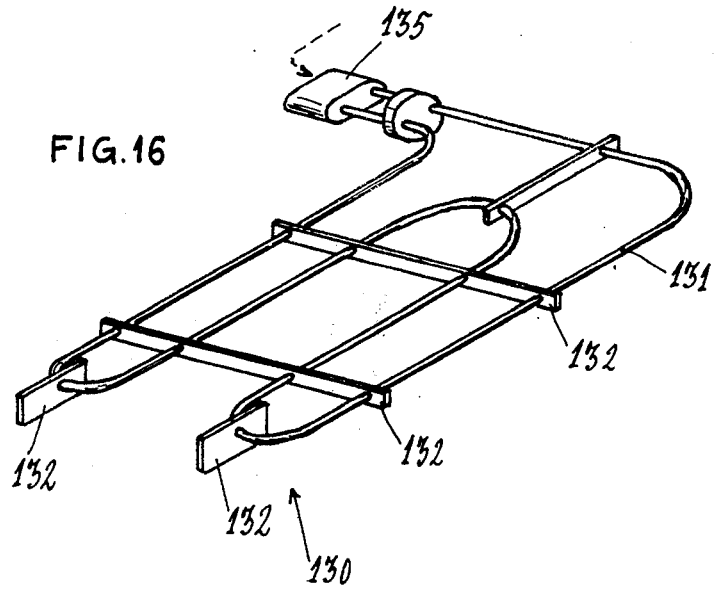

FIG. 12, which is similar to the bottom left portion of FIG. 1, shows an alternative design of the system employed for pivotally attaching the two shells of the portable case and the lower portions of the sides to the shell which serves as a base;

FIG. 13 is similar to FIG. 12 and shows the portable case in the closed position of the cover;

FIG. 14 is a view of the system of articulation of the cover, taken in the direction of the arrow XIV of FIG. 12;

FIG. 15 is a diagrammatic view in perspective showing the gas distributor and the radiant elements of the appliance;

FIG. 16 is an electrical variant of the heating system of the appliance.

Figure 2:
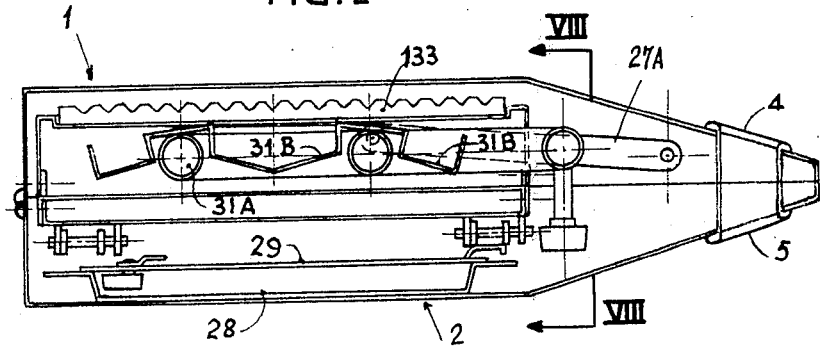
FIG. 2 is a diagrammatic sectional view of the appliance of FIG. 1, in the folded position.

As shown in FIGS. 1 and 2, the shells 1 and 2 of die-stamped sheet metal are articulated at 3. On the side opposite to this articulation, each shell is thinned-down and provided with a cut-out portion fitted with members 4 and 5 of plastic material which form handles.

Each side of the oven is constituted by a sheet-metal plate 6 pivotally mounted at 7-7$_1$ on the inner edge of the shell 2 and by another plate 8 pivotally mounted on the first at 9-9$_1$ and at 10-10$_1$ on a member in the form of a frame 11 which contains the gas burner 31A. A mechanical connection is constituted in the present example by two link-arms 12 pivotally attached on the one hand to the upper shell 1 at 13 and slidably mounted on the other hand at 14 by means of rollers 15$a$ in grooves 15 which are formed on each side of the frame 11 (as shown in FIGS. 1 and 4).

In the position of operation, the flanged edges 16 and 17 of the sides 6 and 8 must be applied against the flanged edges 18 formed on the shell 1 (as shown in FIG. 1) in order to ensure leak-tightness of the oven as well as locking of the cover 1 with the walls 6 and 8 of the oven as will be explained in detail hereinafter. In this position, folding is no longer possible since the flanged edges 16 and 17 come into alignment with the vertical wall which constitutes the rear of the shell 2.

In order to permit folding, the flanged edges 16 and 17 must move away from the flanged edge 18 of the shell 1. To this end, the articulations 7 are slidably mounted along their pivot-pins.

The pivot-pin 19 of the articulation $9_1$ is intended to engage in a recess formed in the flanged edge 18. Torsion springs 20 mounted on the pivot-pins of the articulations 10 apply forces which tend to increase the angle formed by the frame 11 and each side 8 (as shown in FIG. 11).

Figure 6:
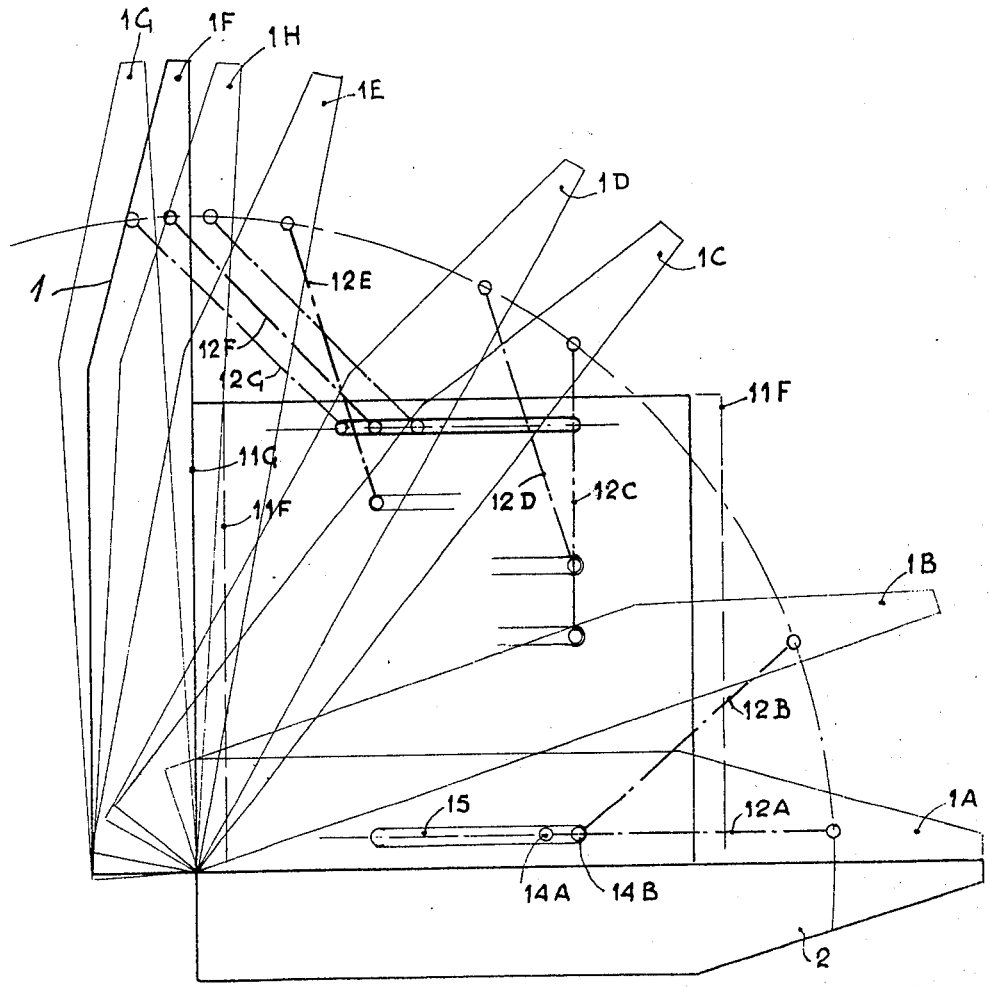
FIG. 6 is a diagrammatic presentation showing the movement of the main portions of the appliance when this latter is unfolded or conversely.

The operation of the appliance will now be described with reference to FIG. 6.

The cover 1 in the closed position is shown at 1A. The corresponding position of the link-arm 12 is at 12A whilst the sliding point of this latter is located at 14A.

By lifting the cover from position 1A to position 1B, the sliding point 14 is displaced from 14A to 14B so as to come into abutment against the end of the groove 15.

By virtue of this free displacement of the cover 1 on the upper frame 11, said cover can readily be handled in order to permit storage of separate accessories if necessary.

By continuing to raise the shell 1 from position 1B to position 1C, the link-arm 12 which is pivotally mounted on the shell 1 at 13 and abuttingly applied at 14B within the groove 15 of the frame 11 lifts this latter progressively as the shell 1 opens. The side-wall flaps 6 and 8 which are folded-back in the closed position unfold from position 1B of the shell 1 (as shown on the right-hand side of FIG. 7).

Figure 7:
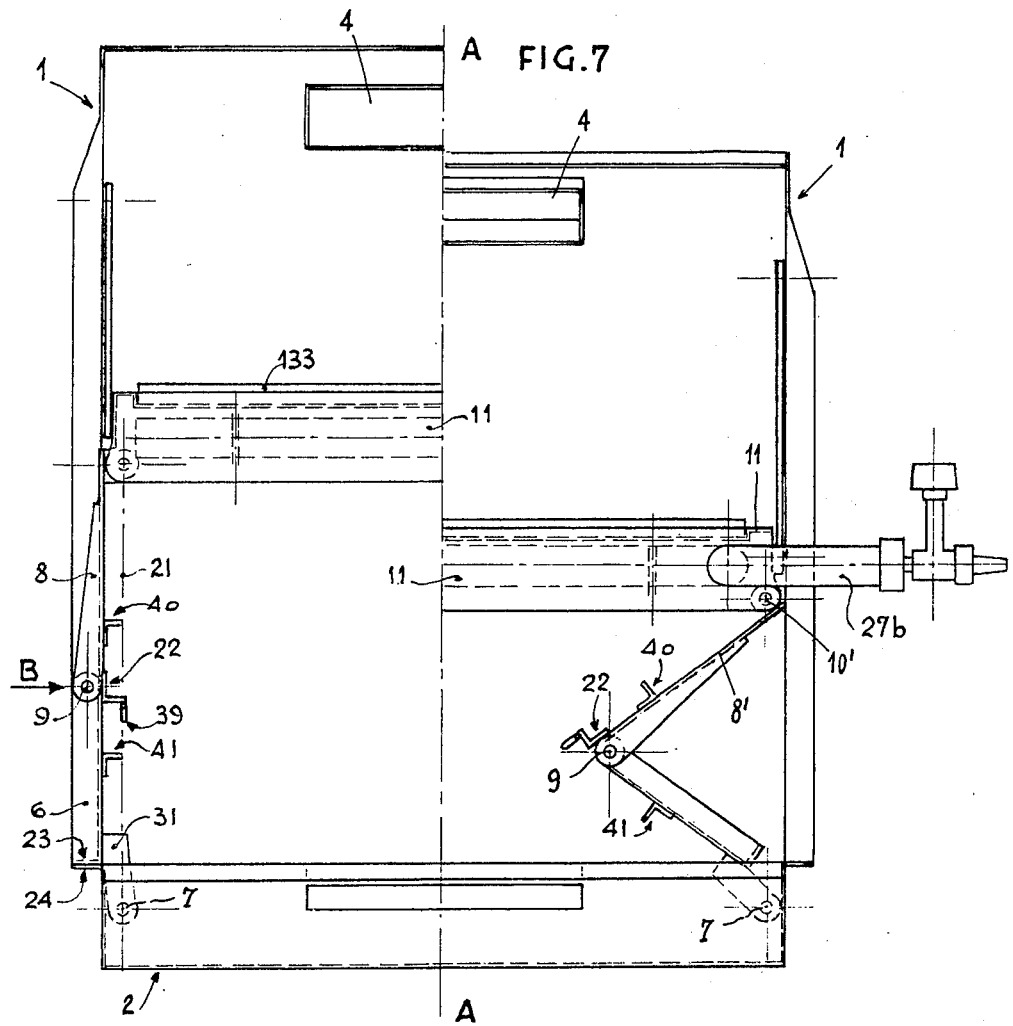
FIG. 7 is a front view taken in the direction of the arrow VII of FIG. 1, wherein the right-hand portion of the figure represents the appliance in the partly folded condition.
Figure 8:
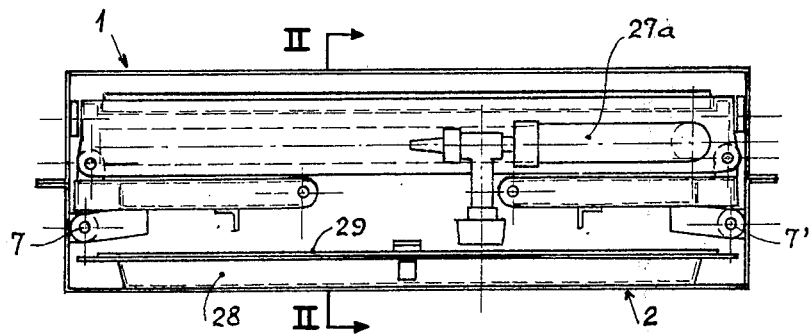
FIG. 8 is a sectional view taken in the direction of the arrow VIII—VIII of FIG. 2.

By continuing to lift the shell 1, the frame 11 moves upwards, the link-arm 12 passes progressively from the above-mentioned position 12B to the vertical position 12C, then takes up a sloping position at 12D until the articulation point 14 slides within the groove 15. This sliding motion continues during the lifting of the shell 1 until the articulation point 14 comes into abutment within the groove 15 in respect of position 12E of the link-arm 12. The angle of slope then increases until the end position 12F is reached, namely in position 1F of the cover 1. This end position is defined by the complete unfolding of the side flaps 6 and 8. The pins 7 and 10 are then in alignment in the plane 21. The axes of the articulations have then passed beyond this plane by virtue of the force applied by the springs 20 (as shown in FIGS. 7 and 11). The side-wall flaps 6, 8 are aligned on each side of the oven.

The displacement of the flap 8 is limited by an opening stop constituted by the application of the bracket 22 (shown in FIG. 4) against the side flap 6; the displacement of the flap 6 is in turn limited by the application of the flanged edge 24 of the shell 2 (shown in FIG. 7). The stacking of the side flaps then becomes stable.

In the end position 12F mentioned earlier, the side flaps 6 and 8 and the frame 11 take up position 11F and a gap remains between the shell 1 and the flaps 6 and 8. In order to close this gap, the complete assembly of side flaps 6, 8 and frame 11 is displaced by hand towards the bottom of the oven which is formed by the cover 1. This movement is permitted by the sliding motion of the articulations 7.

The pivot-pins 19 penetrate into the orifices formed in the edges 18 of the shell 1 and thus ensure locking of the side flaps.

By bringing the cover 1 back from position 1G into position 1F against the side flaps 6 and 8, the catch 25 engages in the stepped recess 26 formed on the flanged edge of the side flaps 8, thus ensuring that the cover 1 is locked in position (as shown in FIGS. 1 and 11).

Figure 5:
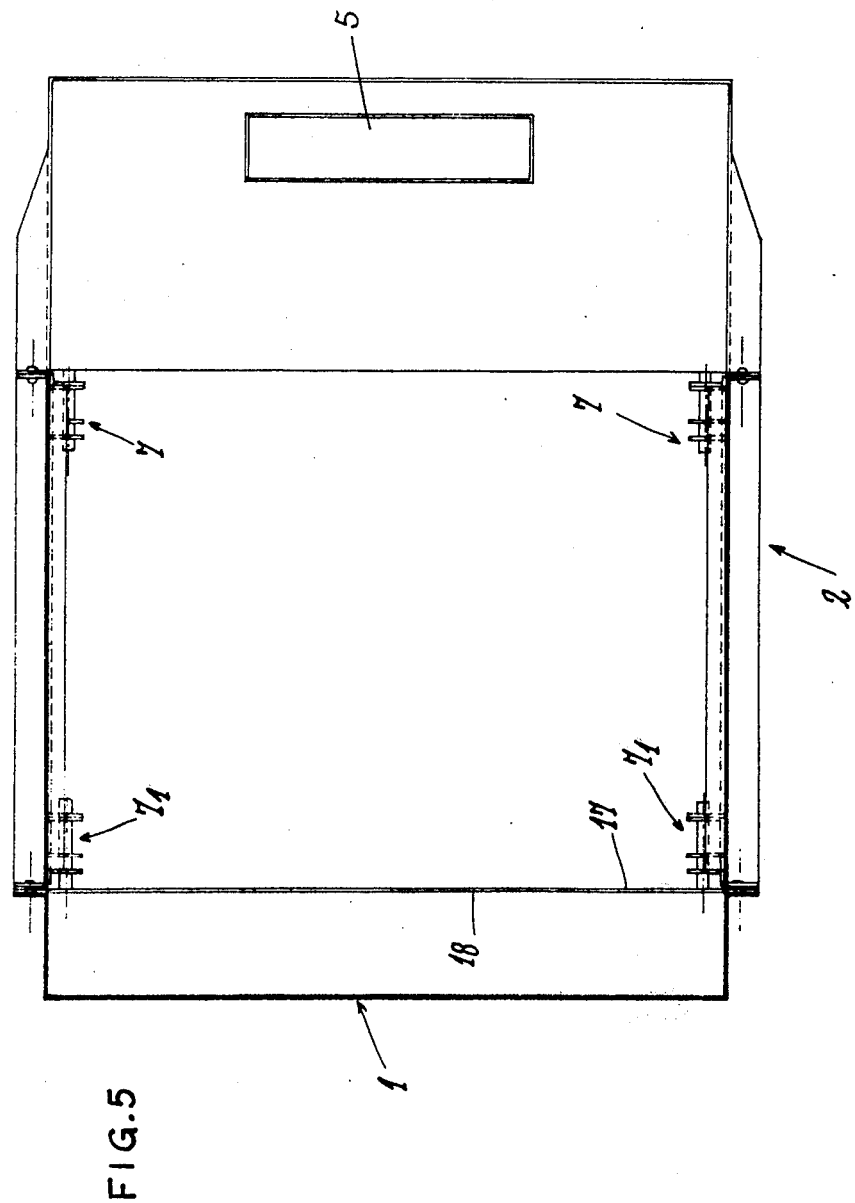
FIG. 5 is a sectional view taken along line V–V of FIG. 1.

The injector-valve 27 is then caused to pivot from the folded position 27a to the utilization position 27b (as shown in FIGS. 4 and 5); the appliance is then ready for use.

In order to carry out the operation which consists in folding the appliance, it is only necessary to withdraw the catches 25, to place the cover 1 in the position 1G, to cause the side flaps to slide along the pins 7A of the inner articulations in order to revert to the folded position, then to apply an effort in the direction of the arrow B (FIG. 7) on both sides while bringing back the cover 1 against the bottom 2 of the portable case.

It is possible to proceed differently. After bringing the side flaps into the folded position (in which the shell assumes the position 1H), the catches 25 are released and an effort is exerted on each side in order to initiate the folding of the side flaps while returning the shell to the closed position.

The equipment of the cooking appliance comprises the following components:
 a removable dripping-pan 28;
 a removable door 29 which is pivotally mounted by means of curved lugs 30 engaged over articulation brackets 31 and is maintained in the closed position by means of the lockingbolt 32 which is engaged behind the burner frame 11;
 a spit 49;
 a roasting-jack 50 which is either of the mechanical type or electrically operated from a dry cell;
 a hot-plate 133.

The removable and reversible hot-plate 133 of aluminum or of cast-iron has a smooth face for heating kitchen utensils such as: saucepans, frying-pans, pressure cookers and the like or a ribbed face for grilling meat by contact. This hot-plate can advantageously be coated with an anti-adhesive film of polytetrafluoroethylene, for example.

The burner distributors are constituted by perforated tubes 31A. The flames heat radiant elements 31B of perforated sheet steel which are thus heated to dull redness. The infrared rays emitted by these elements serve to roast meat or fowl under good conditions.

The portable case is maintained in the closed position by engagement of the catches 25 in lugs which form an integral part of the base 2. The catches 25 can be released for opening the portable case by means of the studs 33 which traverse the sides of the cover 1 through oblong holes 34, as shown in FIG. 1.

The equipment of the appliance as a grill unit comprises a spit 49 which is driven in rotation by an electric reduction-gear motor 50 of the dry-cell or mechanical type. Said motor is attached to the side of the oven by means of a shouldered lug 35 (as shown in FIGS. 3 and 9) which penetrates into an orifice 36 (FIG. 1) in the form of a button-hole slot which is provided in the side flap 8. The narrow portion of said button-hole slot is placed in the direction opposite to the rotation of the spit 49.

In the grilling position of the appliance, the spit 50 is engaged within a coupling 38 of the type consisting of a hollow square shaft extending from the reduction-gear motor and traversing the side flap 6 through a circular orifice 37. The other end of the spit rests and is pivotally mounted in a half-loop consisting of a steel wire 39', said wire being welded beneath the horizontal fold of the guide 22' which is recessed at this point so as to provide a passageway for the spindle. This arrangement is again met with on the flap 8 on the same side as the reduction-gear motor and serves to provide the second support of the spit when the reduction-gear motor is uncoupled.

The length of the spit 50 is shorter than the width of the oven, with the result that said spit can be introduced into the oven and withdrawn therefrom while remaining perpendicular to the side walls 6, 8.

When cooking has been completed and the reduction-gear motor 50 has been uncoupled (as mentioned in the foregoing), a fork 51 having two hooks 52 (FIG. 10) makes it possible to disengage the roasted meat by lifting this latter to a slight extent so as to bring the ends of the spit 49 onto the guides 22, the spit being then readily removed by drawing towards the user.

The side walls 6, 8 are equipped with guides 40 and 41 in order to place the dripping-pan, the grid or the oven plates at a suitable height.

It is readily understood that the invention is not limited to the embodiment which has just been described by way of example and that a large number of alternatives can be contemplated without thereby departing from the scope of the invention.

From this it follows that, in accordance with the arrangement provided in one advantageous variant of the invention (as shown in FIGS. 12, 13 and 14), the portable case can be provided with a special articulation 103 for pivotally mounting the cover 101 on the bottom wall 102 at the rear end of the oven in the service position of the appliance.

The articulation 103 comprises means for bringing the internal wall of the flange 101B of the cover 101 into contact with the rear flanges 16, 17 of the side walls 6, 8 of the oven in the service position and in order to move said cover flange 101B away from the side-wall flanges 16, 17 at the beginning of the movement of closure of the cover 101 in order to fold-back the side walls 6, 8 of the oven.

This makes it possible to simplify the attachment of the side flaps 6 to the bottom wall 102. The articulation 117 is no longer provided with any sliding pin but is formed by means of simple lugs 118, 119 which are welded to the flap 6 and the bottom wall 102. Moreover, the abovementioned arrangement of the articulation 103 facilitates the automatic operation which consists in unfolding or folding of the oven.

In the example illustrated in FIGS. 12 and 13, the articulation 103 comprises a pair of link-arms 106, 107 which are separated from each other and have unequal lengths. Each link-arm is pivotally mounted at its extremities respectively on a support bracket 104 which is rigidly fixed to the cover 101 and on a support bracket 105 which is rigidly fixed to the bottom wall 102. On each bracket 104, 105 aforesaid, the pivot-pins of the link-arms 106, 107 are located in a plane substantially parallel to the plane corresponding to the coupling flange 101B of the cover 101 and to the coupling flange 102B of the bottom wall 102 respectively.

The two pivot-pins of the shorter link-arm 106 are located on the same side as the cover flange 101B and on the same side as the bottom-wall flange 102B with respect to the corresponding pivot-pins of the other link-arm 107. Both link-arms are located within the internal space of the portable case in the closed position of the cover 101.

The shorter link-arm 106 is curved in the shape of a U which is open towards the lower flange 101B of the cover 101 in the open position (as shown in FIG. 12). The profile of the flange 101B is located within the opening of the U of the curved link-arm 106 in the position of complete opening of the cover 101.

It is apparent from FIGS. 12 and 13 that the amplitude of the desired displacement of the lower portion of the flange 101B of the cover 101 corresponds to the difference in obliquity of the short and curved link-arm 106 between the closed position of the cover (link-arm 106 in the upright position) and the closed position of the cover (link-arm 106 folded-back towards the rear flange 102B of the bottom wall 102). By modifying the design dimensions of the link-arms 106, 107 and the positions of the mounting brackets 104, 105, it is possible to obtain a whole range of amplitudes for the above-mentioned displacement, depending on the arrangement adopted in the case of the rear flanges 16, 17 of the side walls 6, 8.

The aforementioned arrangement permits a convenient and very strong construction of the articulation 103.

A further alternative embodiment of the invention is shown in FIG. 16. The heating system 130 is constituted in this alternative example by an electric resistance element 131 rigidly fixed to a mounting frame 132, and fixed on the appliance in such a manner as to be interchangeable with the gas distributor 31A and its radiant plate 31B (as shown in FIG. 15). Electric current is supplied to the resistance element 131 by means of a connector 135, the location of which on the oven corresponds substantially to that of the injection nozzle 27 of the gas distributor 31A.

The appliance can thus be employed without gas and this offers a number of advantages both in regard to convenience and cleanliness, in particular within confined spaces.

What I claim is:

1. In a portable and folding cooking appliance having a bottom and a cover which in folded position appear as a closed case, said appliance comprising an oven having a base and a rear wall respectively adjacent to the bottom and to the cover of said case, said oven moreover comprising collapsible side walls and a top portion associated with an external hotplate, and connecting means between said cover of the case and the top portion for an automatic unfolding operation of the structure of the oven when the case is opened; the improvement wherein said connecting means comprise at least one rod having a pivot linkage on one of its ends and a slidable pivot linkage on the other end, each side wall of the oven comprising two substantially flat portions which are pivotally linked to each other and pivotally linked to the base and to the top portion of the oven respectively, said three pivot linkages comprising parallel axes which are horizontal in the service position of the appliance, on each side of the unfolded oven.

2. An appliance according to claim 1, wherein said side walls of the oven are attached to the bottom of the case by means of articulations which permit a sliding motion of the side walls along the pivot pins of the articulations, so as to bring the rear edge of the side walls into contact with the cover of the case in the service position of the appliance, and to move back said edge to a predetermined distance from the cover in order to fold the oven structure.

3. An appliance according to claim 1, wherein the side walls of the oven, on each side of the latter, have springtype articulations for producing action in the direction of automatic unfolding of the oven structure.

4. An appliance according to claim 1, wherein the intermediate articulation of each side wall has an opening stop in the service position, the pivot pin of said intermediate articulation being located beyond the plane of the adjacent pins in the service position of the appliance.

5. An appliance according to claim 1, comprising a roasting spit transverse to the side walls, wherein the rod of the spit is shorter than the width of the oven, the side walls having guiding channels having recesses for supporting the rod in the service position, and a rotating device removably attached on a side wall and having a shaft end which extends through a side wall of the oven and is coupled to the rod of the spit.

6. An appliance according to claim 1, comprising a portable case having an articulation device for pivotally mounting the cover on the bottom portion at the rear end of the oven in the service position of the appliance, wherein said articulation device comprises means for bringing the cover into contact with the rear edges of the side walls of the oven, and for moving back the cover away from said edges at the beginning of the closure movement of said cover, in order to fold back the side walls of the oven.

7. An appliance according to claim 6, wherein the articulation device for pivotally mounting the cover on the bottom portion comprises at least a pair of separate link arms having unequal lengths, the ends of each link arm being pivotally mounted respectively on a support bracket which is rigidly fixed to the cover and on a support bracket which is rigidly fixed to the bottom portion, the axes about which the ends of the link arms are pivoted on each of the support brackets aforesaid on the same side as the cover and on the same side as the bottom portion being located in a plane substantially parallel to the plane corresponding to the edge which joins the bottom portion to the cover respectively, the two pivotal axes of the shorter link arm being located on the same side as the edge of the cover and of the edge of the bottom respectively with respect to the corresponding pivotal axes of the other link arm.

8. An appliance according to claim 7, wherein the pivotal link arms are located within the internal space of the portable case in the closed position of the cover, at least the shorter of the two link arms of each pair being curved to form a "U" which opens toward the lower edge of the cover in the open position, the profile of said edge coming into position at least partly within the "U" of the curved link arm in the fully open position of the cover.

9. An appliance according to claim 6, wherein the articulation device for pivotally mounting the cover on the bottom portion comprises at least one pair of separate link arms having unequal lengths, the ends of each link arm being pivotally mounted respectively on a support bracket which is rigidly fixed to the bottom portion and on a support bracket which is rigidly fixed to the cover, the axes about which the ends of the link arms are pivoted on each of said support brackets on the same side as the cover and on the same side as the bottom being located in a plane substantially parallel to the plane corresponding to the joining edges of the bottom portion and the cover, the two pivotal axes of the shorter link arm being located on the same side as the edges of the cover and of the bottom portion respectively with respect to the corresponding pivotal axes of the other link arm.

10. An appliance according to claim 9, wherein the pivotal link arms are located within the internal space of the portable case in the closed position of the cover, at least the shorter of the two link arms of each pair being curved to form a "U" which is open towards the lower edge of the cover in the open position, the profile of said edge being arranged to come into position at least partly within the U of the curved link arm in the fully open position of the cover.

11. A portable and collapsible cooking appliance having a bottom and a cover which in its closed position appears as a closed case, said appliance comprising an oven having a base and a rear wall respectively adjacent to the bottom and to the cover of said case, said oven moreover comprising collapsible side walls and a top portion associated with an external hotplate, connecting means between said cover of the case and the top portion of the oven for an automatic unfolding operation of the structure of the latter when the case is opened, said connecting means comprising at least one rod having a pivot linkage on one of its ends and a slidable linkage on the other end, the bottom portion and the cover of the portable case respectively constituting the base and the rear wall of the oven, the side walls of the oven being secured to the bottom portion of the case by means of articulations which permit a sliding motion of the slide walls along the pivot pins of said articulations so as to bring the rear edges of the side walls into contact with the cover of the portable case in the service position of the appliance and to move said edges to a predetermined distance from the cover in order to fold the oven structure.

12. An appliance according to claim 11, comprising a portable case provided with an articulation device for pivotally mounting the cover on the bottom portion at the rear end of the oven in the service position of the appliance, wherein said articulation device comprises means for bringing the cover into contact with the rear edges of the side wall of the oven in the service position and for moving the cover away from said edges at the beginning of the movement of closure of said cover in order to fold back the side walls of the oven.

* * * * *

UNITED STATES PATENT OFFICE
CERTIFICATE OF CORRECTION

PATENT NO. : 3,899,961
DATED : August 19, 1975
INVENTOR(S) : Pierre J. TANGUY

It is certified that error appears in the above-identified patent and that said Letters Patent are hereby corrected as shown below:

On the cover sheet, item [30], "Foreign Application Priority Data" add --June 26, 1973   France........73.23267--

*Signed and Sealed this*

*second* Day of *December 1975*

[SEAL]

Attest:

RUTH C. MASON
*Attesting Officer*

C. MARSHALL DANN
*Commissioner of Patents and Trademarks*